US008482763B2

(12) United States Patent
Suzuki

(10) Patent No.: US 8,482,763 B2
(45) Date of Patent: Jul. 9, 2013

(54) METHOD AND APPARATUS FOR GENERATING A FILE USING ADDRESS AND INFORMATION TAGS

(75) Inventor: Takeshi Suzuki, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 12/276,960

(22) Filed: Nov. 24, 2008

(65) Prior Publication Data
US 2009/0141304 A1    Jun. 4, 2009

(30) Foreign Application Priority Data
Nov. 29, 2007   (JP) .................................. 2007-309060

(51) Int. Cl.
*G06F 3/12*   (2006.01)
(52) U.S. Cl.
USPC ........................................................ 358/1.15
(58) Field of Classification Search
USPC ......................................... 358/1.13, 1.15, 1.2
See application file for complete search history.

(56) References Cited

U.S. PATENT DOCUMENTS

| 6,101,526 | A | 8/2000 | Mochizuki |
| 2004/0012802 | A1* | 1/2004 | Allen et al. ................... 358/1.13 |
| 2005/0254072 | A1 | 11/2005 | Hirai et al. |
| 2007/0046974 | A1* | 3/2007 | Machida ...................... 358/1.14 |

FOREIGN PATENT DOCUMENTS

| JP | 2001-333372 A | 11/2001 |
| JP | 2002-314724 A | 10/2002 |
| JP | 2003-187215 A | 7/2003 |
| JP | 2003-187215 A | 7/2003 |
| JP | 2003-271341 A | 9/2003 |
| JP | 2003-348506 A | 12/2003 |
| JP | 2006-139632 A | 6/2006 |

OTHER PUBLICATIONS

IBM DCF Version Release 4.0, Modified May 22, 2007.*

* cited by examiner

*Primary Examiner* — Eric A Rust
(74) *Attorney, Agent, or Firm* — Canon U.S.A., Inc. IP Division

(57) ABSTRACT

An original image file and a shortcut image file corresponding to original image data representing the original image file are provided for file management. An address tag representing a location in which the original image file is stored and an additional information tag such as information on printing of the original image file or information on layout are stored in a particular data region in the shortcut image file. In a case where the additional information represents information on image processing to be performed before printing, when an instruction of printing of the shortcut image file is issued, the image processing is performed on image data of the original image file and a resultant image data is printed. Basic data of a thumbnail image included in the shortcut image file is obtained by performing processing represented by the additional information tag on the thumbnail image data.

10 Claims, 13 Drawing Sheets

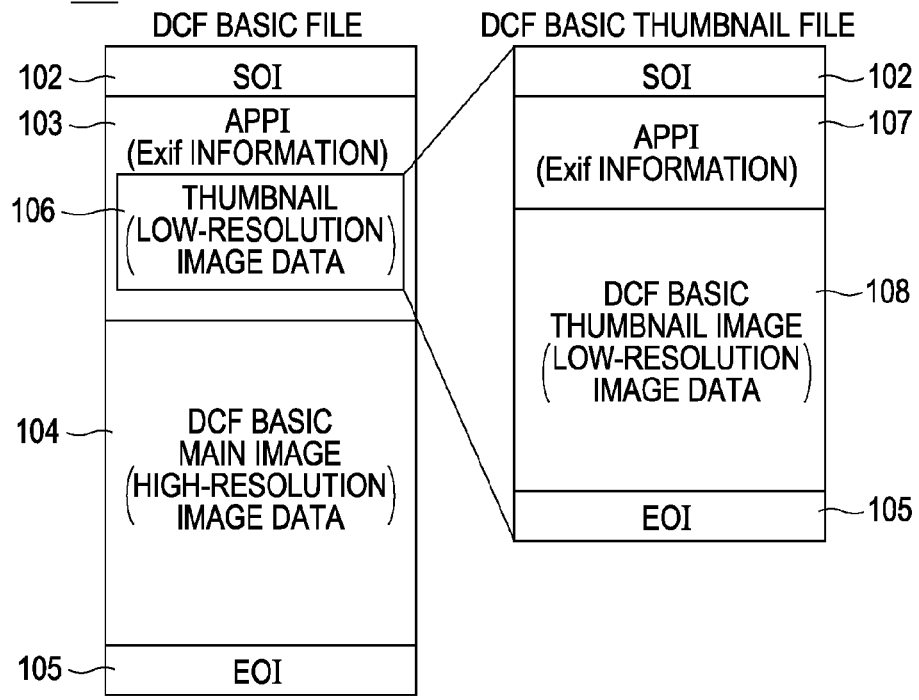
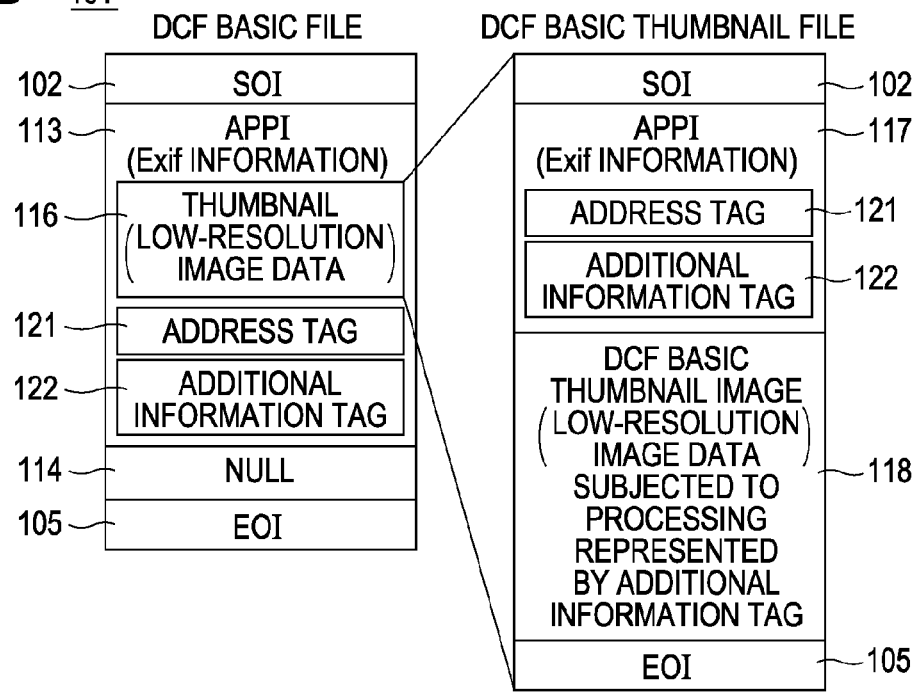

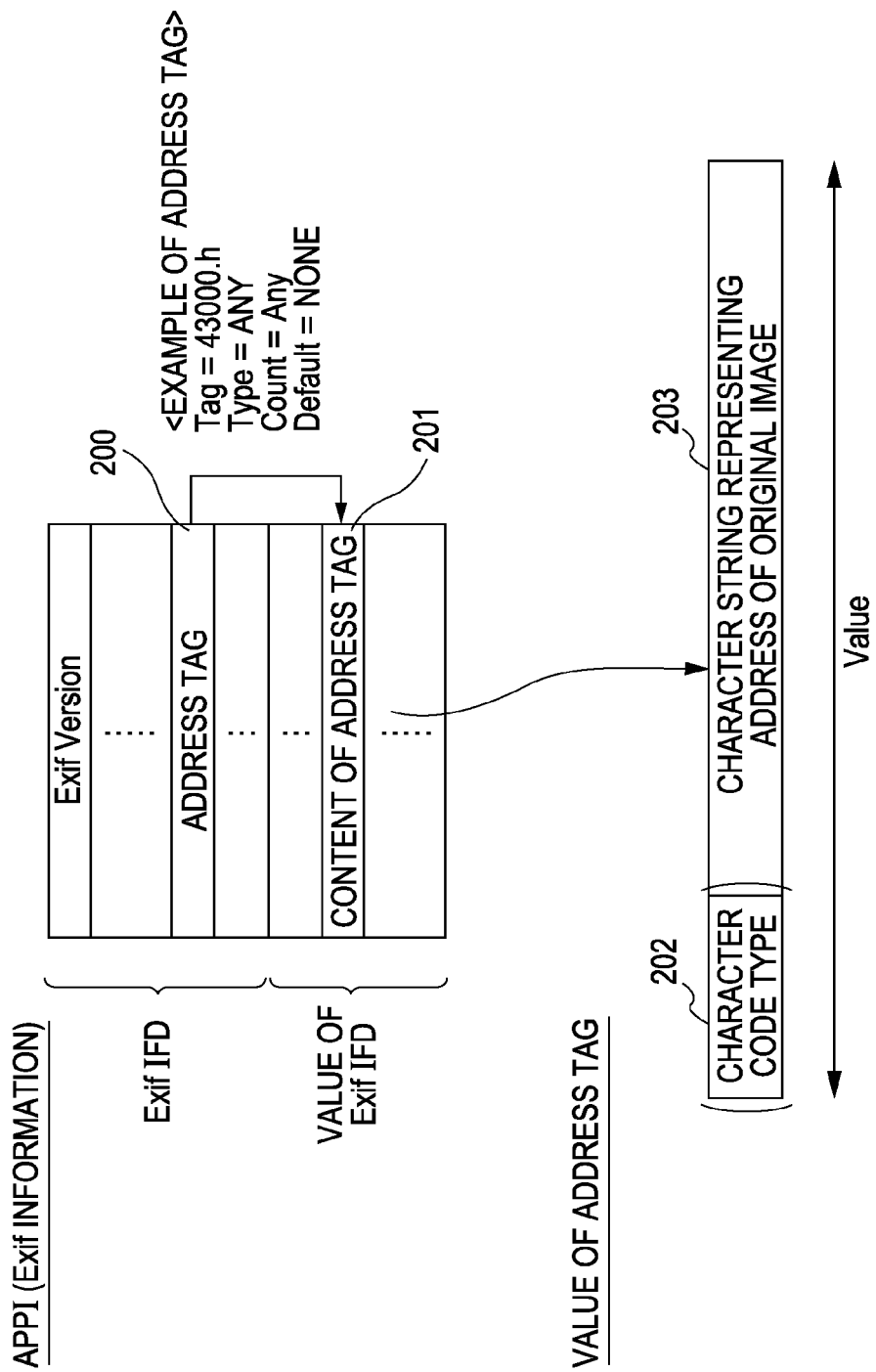

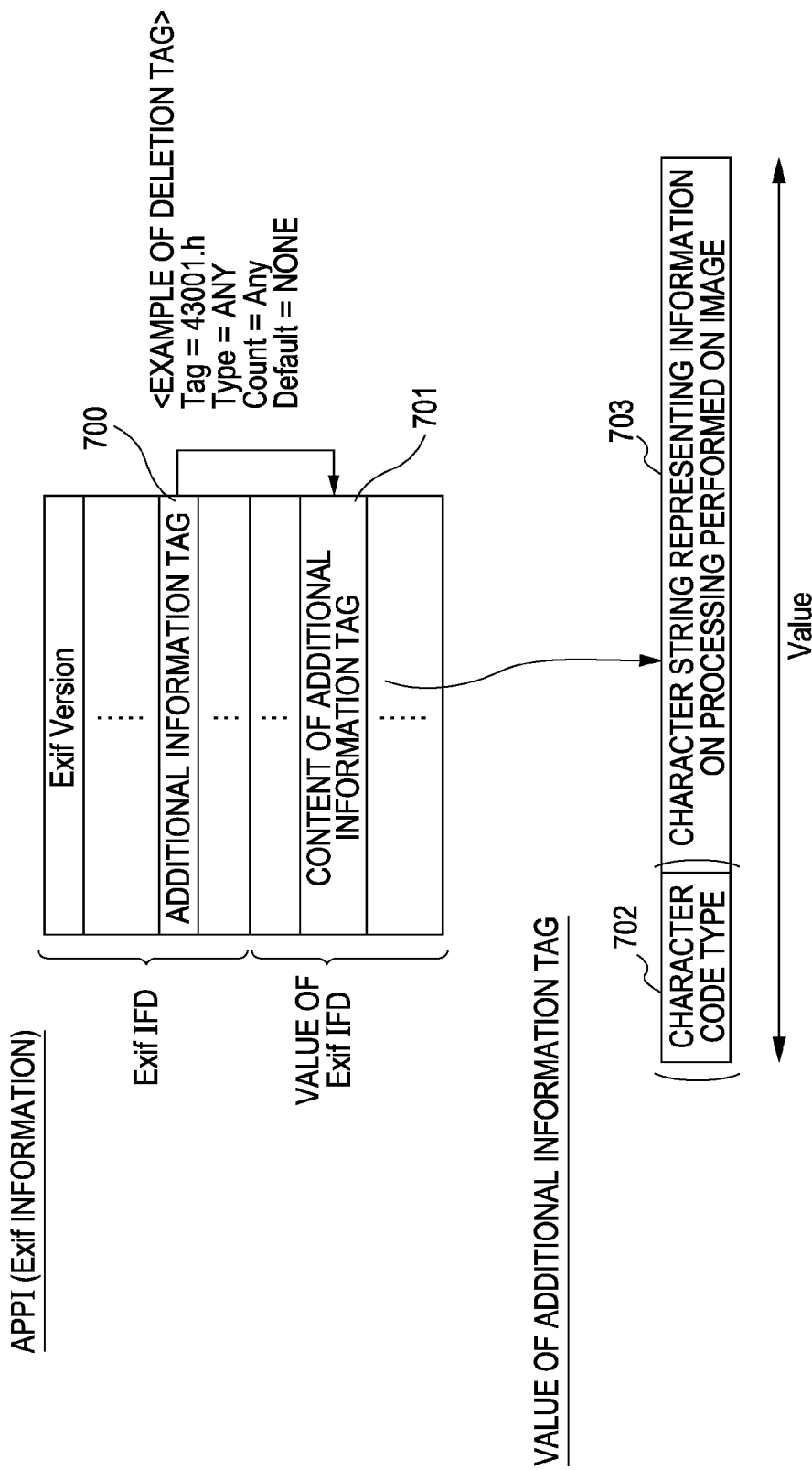

FIG. 8

STORAGE AREA FOR ORIGINAL IMAGES: SERVER
STORAGE AREA FOR SHORTCUT IMAGES: TERMINAL

SERVER http://www.canon.co.jp/original-image/

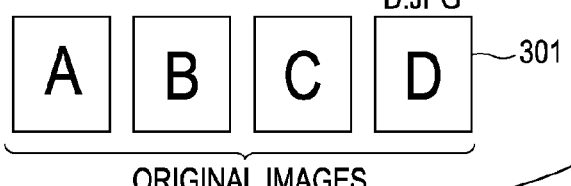

ORIGINAL IMAGES — 301, D.JPG

TERMINAL C:\My Pictures\shortcut-image\

SHORTCUT IMAGES — d.JPG 302, d'.JPG 303

VALUE OF ADDRESS TAG OF SHORTCUT IMAGES
"d.JPEG" AND "d'.JPEG"  — 304 http://www.canon.co.jp/original-image/D.JPG

VALUE OF ADDITIONAL INFORMATION
TAG OF SHORTCUT IMAGE "d.JPEG"

NONE — 305

VALUE OF ADDITIONAL INFORMATION
TAG OF SHORTCUT IMAGE "d'.JPEG"

BLACK-AND-WHITE PRINTING — 306

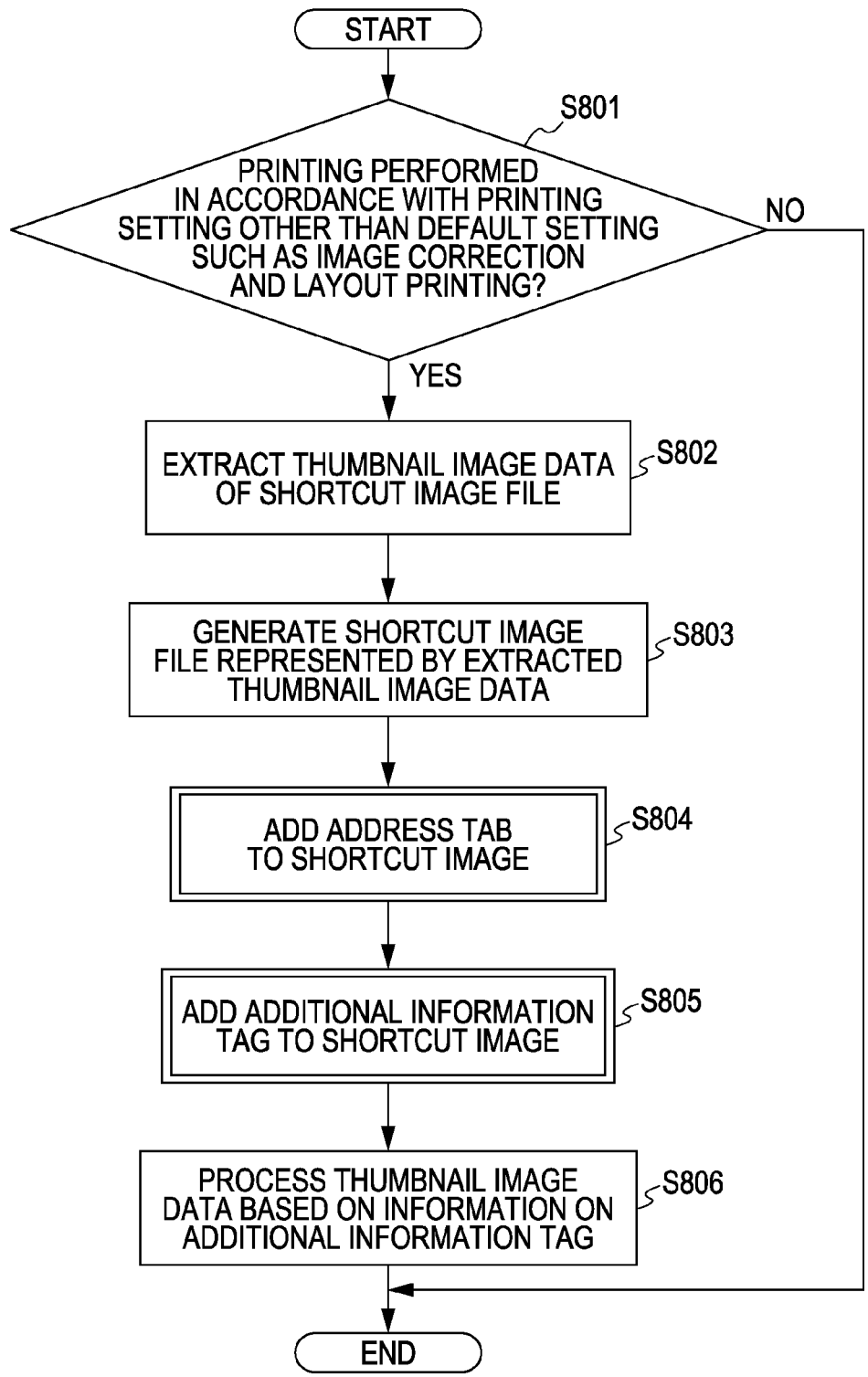

METHOD AND APPARATUS FOR GENERATING A FILE USING ADDRESS AND INFORMATION TAGS

BACKGROUND OF THE INVENTION

1. Field of the Invention

The present invention relates to a computer-readable-recording medium storing a program and an image file management apparatus which are suitably used for dividedly recording an image file.

2. Description of the Related Art

As a method for managing image files, a method employing a format, such as DCF (Design rule for Camera File system), in which high-resolution real image data and low-resolution thumbnail image data constitute a single image file has been proposed. In this management method, the high-resolution image data is referred to when detailed information of image data is to be obtained, whereas the low-resolution image data is referred to when brief information of the image data is to be obtained. Accordingly, this method has an advantage in that information to be referred to is selected in accordance with an object of usage of the image data.

However, with the method for managing image data described above, since a single file should include low-resolution image data and high-resolution image data, even when only brief information of the image data is to be obtained, that is, the high-resolution image data is not referred to, a file of a large size including the high-resolution image data should be used. In particular, in communication of data such as communication using e-mails or facsimiles, it is important to realize a size of image file data which is transmitted and received which attains a high efficiency.

To obtain image file data of a size attaining a high efficiency, U.S. Pat. No. 6,101,526 discloses the following technique. Specifically, low-resolution image data and high-resolution image data are separated from each other, and only the low-resolution image data is attached to an e-mail to be transmitted. Then, only when the high-resolution image data is necessary, a user who received the e-mail obtains the high-resolution image data through another communication unit in accordance with an instruction described in the e-mail.

However, in the management method disclosed in U.S. Pat. No. 6,101,526, the user should obtain the high-resolution image data in accordance with the instruction described in the e-mail including the low-resolution image data attached thereto. That is, the user cannot refer to an image file including the high-resolution image data only using an image file including the low-resolution image data.

United State Patent Application Publication No. 2005/0254072 discloses the following technique. Specifically, in an original image including a first image file and a second image file, the second image file only having a thumbnail of a resolution lower than that of a first image is separated from the first image file. Then, high-resolution data and low-resolution data are separately managed so that a second image having a lower resolution is normally used and a first image having a higher resolution is used as needed. United States Patent Application Publication No. 2005/0254072 further discloses processing of obtaining the high-resolution data using the low-resolution data using the image files separately managed.

As described above, in United States Patent Application Publication No. 2005/0254072, exemplary embodiments of format determination associated with the method for separately managing images are disclosed, and processing of generating image files in accordance with the method for separately managing images is proposed. Furthermore, processing of obtaining image files separately managed in accordance with the proposed method is disclosed.

However, United States Patent Application US2005/0254072 does not disclose setting of printing such as setting of image processing used for printing the original image file (high-resolution data). Therefore, only with the technique disclosed in United States Patent Application US2005/0254072, when the original image file (high-resolution data) is obtained in accordance with the thumbnail image file (low-resolution data) and printing processing is performed after image processing is performed, the user should instruct the image processing every time the printing processing is performed. That is, the user should perform cumbersome operations.

As a technique of performing the image processing on a first image and performing the same image processing on a second image associated with the first image, Japanese Patent Laid-Open No. 2003-187215 discloses a technique of performing various image correction operations on an original image so that at least one resultant image is generated and displaying the at least one resultant image on a display. In this technique, a user selects one of the image correction operations so that image correction is performed on the original image and at least one resultant image which is corrected is stored. Specifically, when the original image is subjected to the image correction and a resultant corrected image is printed in accordance with a user's instruction, the corrected image is stored as it is so that the corrected image which is obtained through the same image correction is easily printed the next time. Consequently, when the user wishes to print the corrected image which is obtained through the same image correction, printing is performed not using the original image but using the corrected image which is obtained through the image correction. In this way, setting of image processing is not necessary to be performed every time the printing processing is performed.

Furthermore, Japanese Patent Laid-Open No. 2001-333372 discloses a technique of displaying, when an original image is corrected, a thumbnail image, which is similarly corrected, corresponding to the corrected original image.

Moreover, Japanese Patent Laid-Open No. 2003-348506 discloses a technique of storing use histories of thumbnail images in an image editing device so that a user easily recognizes an image which has been used in the past when the user views a list of the thumbnail images.

However, in the technique disclosed in Japanese Patent Laid-Open No. 2003-187215 described above, there arises a problem in that, since a corrected image is stored every time image correction is performed, the number of corrected images derived from a single original image is increased, and accordingly, an amount of image data which is managed by a user is considerably increased.

SUMMARY OF THE INVENTION

The present invention provides a computer-readable recording medium storing a program and an image file management apparatus which are capable of smoothly controlling image processing, for example, performed on a plurality of files which are associated with one another.

To address this problem, the following exemplary embodiments have been proposed herein.

According to an embodiment of the present invention, there is provided a computer-readable recording medium storing a program which causes a computer to execute determining, when an instruction of output using an image file is issued, whether the image file includes an additional information tag representing information on change of an output format for output from a derivation-source image file, executing, when it is determined that the image file includes the additional information, processing of changing the output format of image data included in the derivation-source image file in accordance with the information represented by the additional information tag, and outputting the image data in which the output format thereof is changed.

According to a second embodiment of the present invention, there is provided a computer-readable recording medium storing a program which causes a computer to execute obtaining, using a derivation-source image file including first image data, second image data having a resolution lower than that of the first image data, generating an additional information tag representing information on change of an output format for output from the derivation-source image file, and generating an image file including the second image data and the additional information tag.

With this configuration, since the additional information tag representing the information on the change of the output format of the image data of the derivation-source image file is added to the image file, the output format of the image data of the derivation-source image file can be changed using only the additional information tag of the image file. Accordingly, management, such as image processing, of the files can be performed with ease.

Further features of the present invention will become apparent from the following description of exemplary embodiments with reference to the attached drawings.

BRIEF DESCRIPTION OF THE DRAWINGS

FIGS. 2A and 2B are schematic diagrams illustrating a format of an original image file (derivation-source image file) and a format of a shortcut image file, respectively.

FIG. 3 is a diagram illustrating a data configuration of an address tag.

FIG. 4 is a diagram illustrating a data configuration of an additional information tag.

FIG. 8 is a diagram illustrating a first example of a relationship between the original image file and the shortcut image file.

FIG. 10 is a flowchart illustrating a method for newly generating a shortcut image file from the shortcut image file first generated.

DESCRIPTION OF THE EXEMPLARY EMBODIMENTS

Figure 1:
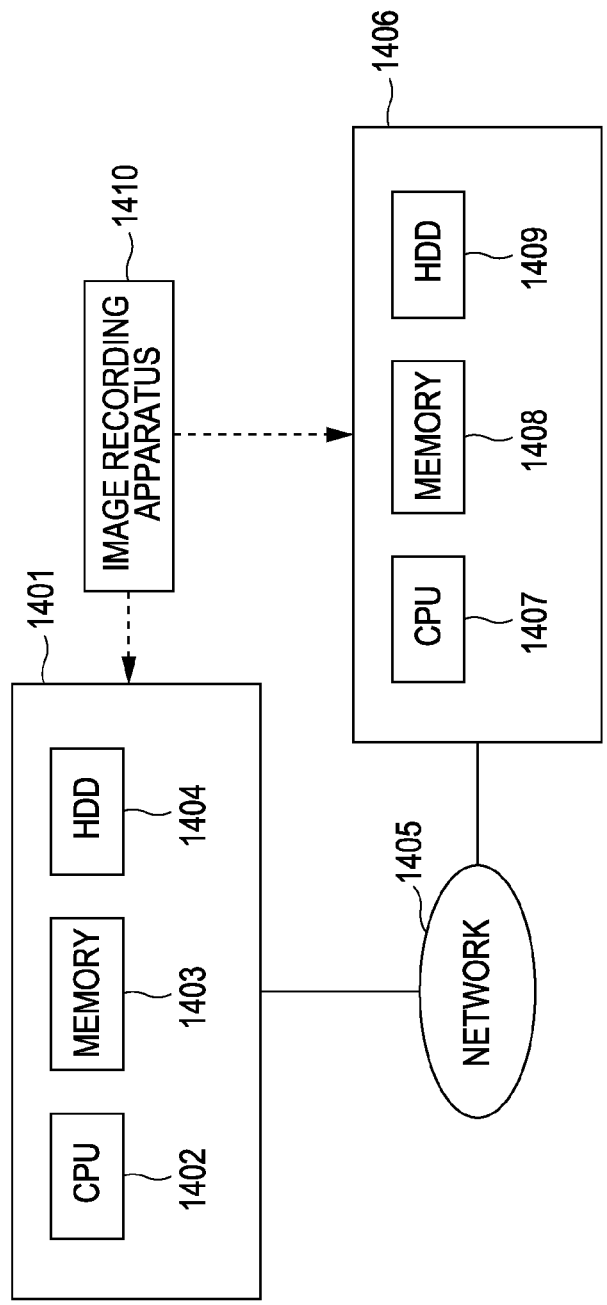
FIG. 1 is a block diagram illustrating an example of an image file management system employed in execution of an image file management method according to an exemplary embodiment of the present invention.

An exemplary embodiment of the present invention will be described in detail hereinafter with reference to the accompanying drawings. FIG. 1 is a block diagram illustrating an example of an image file management system employed in execution of an image file management method according to an exemplary embodiment of the present invention.

As shown in FIG. 1, the image file management system includes a server 1401 and a terminal apparatus 1406 connected to the server 1401 through a network 1405. The server 1401 includes a CPU 1402, a memory 1403, and an HDD (Hard Disk Drive) 1404. The HDD 1404 includes programs regarding provision of on-line photo album service, for example. The terminal apparatus 1406 corresponds to a personal computer, for example, and includes a CPU 1407, a memory 1408, and an HDD 1409. In this exemplary embodiment, the server 1401 and the terminal apparatus 1406 function as an image file management apparatus. Note that a scanner, a digital still camera, or a PDA (personal Digital Assistance), for example, may be employed as the terminal apparatus 1406. Furthermore, a printer, for example, may be employed as the server 1401. Moreover, a communication in a local environment such as a USB (Universal Serial Bus), for example, may be employed as the network 1405.

The server 1401 and the terminal apparatus 1406 each include input interfaces, and an image recording apparatus 1410 which stores an image file is connected to the server 1401 and the terminal apparatus 1406 through the input interfaces. The image recording apparatus 1410 corresponds to a digital still camera, for example.

A format of an image file processed in this exemplary embodiment will now be described. In this exemplary embodiment, two types of image files, i.e., an original image file (derivation-source image file) and a shortcut image file (image file), are processed. The original image file corresponds to a file including high-resolution image data (original image data) obtained by photographing using the digital still camera (image pickup apparatus), for example. On the other hand, the shortcut image file corresponds to a file including image data (shortcut image data) which is generated on the basis of the original image data and which has a resolution lower than that of the original image data. The shortcut image file at least includes information on a location of thumbnail image data derived from the original image data and information on a location of the original image file.

In this exemplary embodiment, a DCF/Exif (Digital rule for Camera File system/Exchangeable Image File) format is employed as a basic format of an image file. Accordingly, in description described hereinafter, terms based on the DCF/Exif standard (or the JPEG standard) are used as needed for representing particular portions of the image file hereinafter.

FIGS. 2A and 2B are schematic diagrams illustrating a format of the original image file (derivation-source image file) and a format of the shortcut image file, respectively.

First, an original image file 100 will be described. As a format of a DCF basic file included in the original image file 100, the DCF basic file includes an SOI (Start of Image) 102, an APP1 103, a DCF basic main image data 104, and an EOI (End of Image) 105. The SOI 102 corresponds to a marker code (normally, 0xFFD8) representing a beginning portion of compression image data. An EOI 105 corresponds to a marker code (normally, 0xFFD9) representing an end portion of the compressed image data and is paired with the SOI 102. In the DCF standard, a beginning portion of data is represented by an SOI, and an end portion of the data is represented by an EOI. The APP1 103 corresponds to an application marker segment, and thumbnail image data 106 which is additional information for a main image and which is low-resolution image data is stored in a data region included in the APP1 103. As a format of the thumbnail image data 106, the thumbnail image data 106 includes the SOI 102, an APPI1 107, a DCF basic thumbnail image data 108, and the EOI 105. Similarly to the DCF basic file, a beginning portion of the data is represented by the SOI 102, and an end portion of the data is represented by an EOI 105. Note that the APPI1 107 included in the thumbnail image data 106 may includes data corresponding to data included in the APP1 103 of the DCF basic file. A resolution of the DCF basic main image data 104 is higher than that of the DCF basic thumbnail image data 108.

As described above, the original image file 100 based on the DCF standard includes the low-resolution DCF basic thumbnail image data 108 and the high-resolution DCF basic main image data 104 (first image data) in this exemplary embodiment. Therefore, a user refers to the DCF basic thumbnail image data 108 when the user wishes to know brief information on an image whereas the user refers to the DCF basic main image data 104 when the user wishes to know detailed information on the image.

Next, a shortcut image file 101 will be described. As a format of a DCF basic file of the shortcut image file 101, the DCF basic file includes the SOI 102, an APP1 113, null data 114, and the EOI 105. In a data region of the APP1 113, thumbnail image data 116 is stored. Furthermore, an address tag 121 representing a location of the original image file 100 is stored in the data region of the APP1 113. Moreover, an additional information tag 122 representing information on setting such as information on image processing or information on layout used when the original image file 100 corresponding to the shortcut image file 101 is printed is also stored in the data region of the APP1 113. In a case where the additional information tag 122 represents the information on image processing performed before performing printing, when an printing instruction for the shortcut image file 101 is issued, the image processing is performed on image data included in the original image file 100 corresponding to the shortcut image file 101 and an image corresponding to the image data subjected to the image processing is printed. On the other hand, in a case where the additional information tag 122 represents the information on layout used at a time of printing, when an printing instruction for the shortcut image file 101 is issued, processing of changing layout is performed on the image data included in the original image file 100 corresponding to the shortcut image file 101 and an image corresponding to the image data subjected to the processing of changing layout is printed. As described above, unlike the original image file 100, the shortcut image file 101 does not require the DCF basic main image data 104, but includes the null data 114 instead of the DCF basic main image data 104. As a format of the thumbnail image data 116 (second image data), the thumbnail image data 116 includes the SOI 102, an APP1 117, a DCF basic thumbnail image data 118, and the EOI 105. The DCF basic thumbnail image data 118 is obtained by performing processing represented by the additional information tag 122 on the thumbnail image data 116. Therefore, when the additional information tag 122 does not include setting information, the DCF basic thumbnail image data 118 matches the thumbnail image data 116. Similarly to the DCF basic file, a beginning portion of the data is represented by the SOI 102, and an end portion of the data is represented by the EOI 105. Note that the APP1 117 of the thumbnail image data 116 may include data similar to data included in the APP1 113 of the DCF basic file.

As described above, the shortcut image file 101 is based on the DCF standard in this exemplary embodiment, and the address tag 121 and the additional information tag 122 are assigned to the data region of the APP1 113. Note that main image data is not necessary.

However, the main image data may be included in the shortcut image file 101. Furthermore, a plurality of shortcut image files 101 may be used for the single original image file 100. When the address tag 121 is included a file, the file is recognized as the shortcut image file 101. Alternatively, a tag used to distinguish the file from original image data may be assigned.

A data configuration of the address tag 121 will now be described. FIG. 3 is a diagram illustrating the data configuration of the address tag 121.

An address tag 200 corresponding to the address tag 121 is recorded in "Exif IFD" in accordance with the Exif (DCF) standard. A private tag number (43000, for example) of a Tiff (Tag Image File Format) is employed for a tag number of the address tag 200.

As shown in FIG. 3, "Value" representing content of the address tag 200 is recorded in "Value of Exif IFD". A location in which "Value" is stored is described in "Value Offset" of the address tag 200. In the address tag 200, "Tag", "Type", "Count", and "Value Offset" are not particularly specified, and "ANY" is assigned to "Type" and "Count", for example.

Content 201 ("Value") of the address tag 200 has the following configuration. Specifically, as shown in FIG. 3, in a beginning portion of "Value" of the address tag 200, character-code type information 202 used to identify a character code which follows the character-code type information 202 is recorded. As the character-code type information 202, one of an ASCII code, a JIS code, a Unicode, and other character codes may be employed.

Following the character-code type information 202, an address character string 203 representing a location in which the original image file 100 is stored is recorded in "Value of the address tag". The address character string 203 includes a path name representing the location of the original image file 100 and a name of the original image file. An offset of "Value of the address tag" is written to the "Value Offset" in accordance with the TIFF standard.

Note that the character-code type information 202 may not be stored in "Value of the address tag", and only the character string 203 representing an address of the original image file 100 may be stored in "Value of the address tag". For example, when a certain code (UTF-8, for example) is fixedly used as a character code, the character-code type information 202 is not required. On the other hand, when UTF-16 is employed for encoding, a byte order mark ("ZERO WIDTH NO-BREAK SPACE character", 0xFEFF or 0xFFFE) defined by Appendix E of ISO/IEC 10646 and Appendix B of Unicode should come first. Furthermore, identification codes (0xEF, 0xBB, and 0xBF) may be assigned to first three bytes in order to clearly represent that UTF-8 is used.

Alternatively, "Value of the address tag" may be recorded in accordance with UDF. In this case, the character-code type information 202 is assigned to a first byte of "Value", followed by a length of a character string to the next one byte, and the address character string 203 representing the location in which the original image is stored to another next one byte.

In this exemplary embodiment, such address tags 121 are assigned to shortcut image files 101. Therefore, an application or an image control apparatus capable of access such a shortcut image file 101 can obtain the location in which the original image file 100 corresponding to the shortcut image file 101 is stored from the shortcut image file 101. Accordingly, although a size of the original image file 100 is large, for example, when the original image file 100 is stored in the server 1401, the original image file 100 is easily obtained using the shortcut image file 101 having a small size. That is, even when storage capacity of the terminal apparatus 1406 is small, the terminal apparatus 1406 can reliably access the original image file 100 with ease.

Furthermore, when only brief information on the image data is to be obtained, the shortcut image file 101 having a small size to such an extent that a memory area used to store an image corresponding to the image data is not disturbed is used. On the other hand, when detailed information on the image data is to be obtained, the original image file 100 is used.

A data configuration of the additional information tag 122 will now be described. FIG. 4 is a diagram illustrating the data configuration of the additional information tag 122.

An additional information tag 700 corresponding to the additional information tag 122 is recorded in "Exif IFD" in accordance with the Exif (DCF) standard. A private tag number (43001, for example) of the Tiff (Tag Image File Format) is employed for a tag number of the additional information tag 700.

As shown in FIG. 4, "Value" representing content of the additional information tag 700 is recorded in "Value of Exif IFD". A location in which "Value" is stored is described in "Value Offset" of the additional information tag 700. In the additional information tag 700, "Tag", "Type", "Count", and "Value Offset" are not particularly specified, and "ANY" is assigned to "Type" and "Count", for example.

Content 701 ("Value") of the additional information tag 700 has the following configuration. Specifically, as shown in FIG. 4, in a beginning portion of the "Value" of the additional information tag 700, character-code type information 702 used to identify a character code which follows the character-code type information 702 is recorded. As the character-code type information 702, one of the ASCII code, the JIS code, the Unicode, and other character codes may be employed.

Following the character-code type information 702, a character string 703 representing additional information associated with the setting of the image processing is recorded in "Value of additional information tag". An offset of "Value of additional information tag" is written to the "Value Offset" in accordance with the TIFF standard.

Note that the character-code type information 702 may not be stored in the "Value of the additional information tag", and only the character string 703 representing the additional information associated with the setting of the image processing to be performed on the original image file 100 may be stored in the "Value of the additional information tag". For example, when a certain code (UTF-8, for example) is fixedly used as a character code, the character-code type information 702 is not required. On the other hand, when UTF-16 is employed for encoding, a byte order mark ("ZERO WIDTH NO-BREAK SPACE character", 0xFEFF or 0xFFFE) defined by Appendix E of ISO/IEC 10646 and Appendix B of Unicode should come first. Furthermore, identification codes (0xEF, 0xBB, and 0xBF) may be assigned to first three bytes in order to clearly represent that UTF-8 is used.

Alternatively, "Value of the address tag" may be recorded in accordance with UDF. In this case, the character-code type information 702 is assigned to a first byte of "Value", followed by a length of a character string to the next one byte, and the address character string 703 representing the location in which the original image is stored to another next one byte.

In this exemplary embodiment, such additional information tags 122 are assigned to shortcut image files 101. Therefore, an application or an image control apparatus capable of access such a shortcut image file 101 can obtain additional information associated with the setting of the image processing to be performed on the original image file 100 corresponding to the shortcut image file 101 using the shortcut image file 101. Accordingly, in a case where the image processing is to be performed using the shortcut image file 101, image processing which has already been performed on the original image file 100 is easily recognized.

Figure 5:
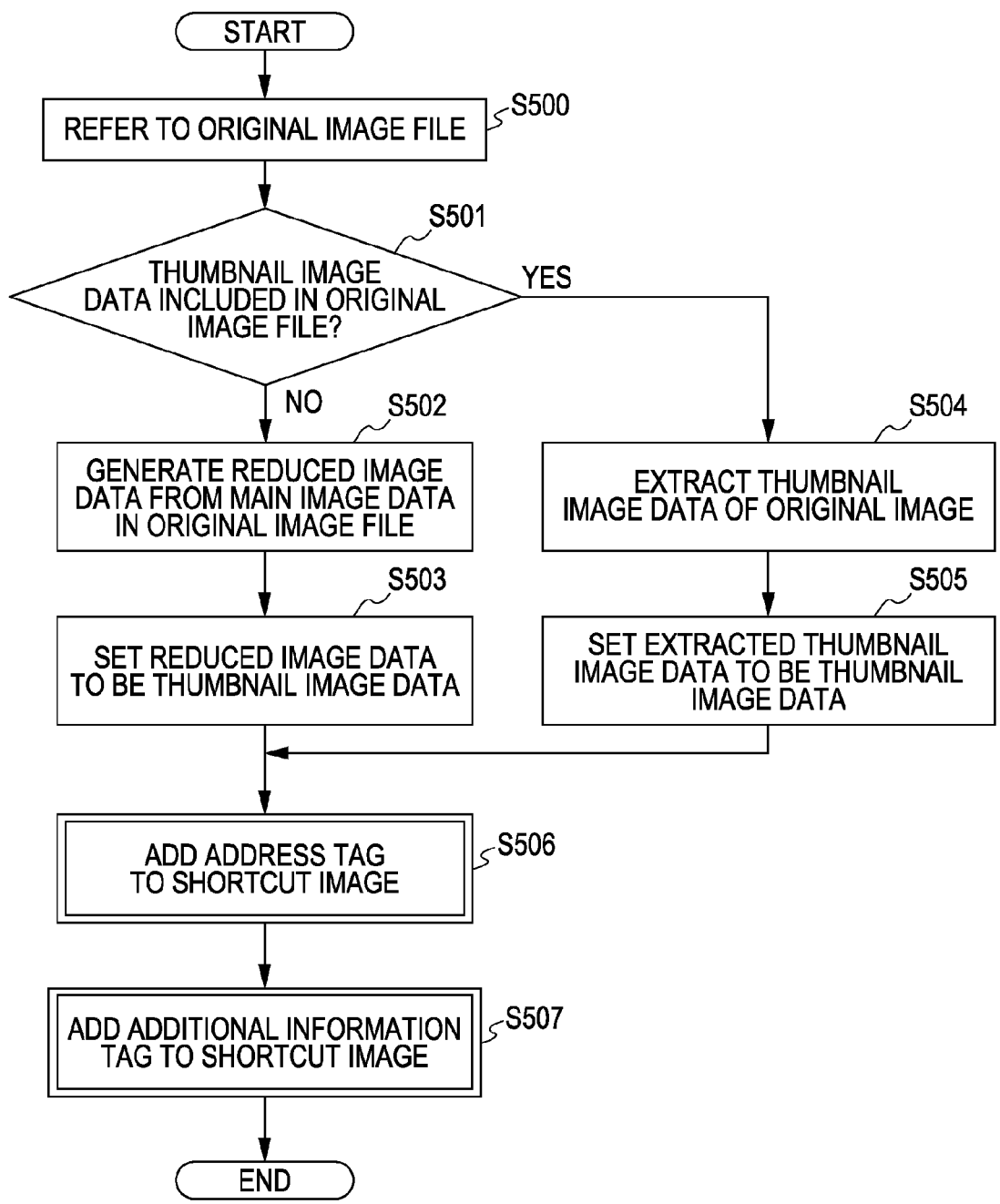
FIG. 5 is a flowchart illustrating a method for generating the shortcut image file without printing.

A method for directly generating the shortcut image file 101 from the original image file 100 without printing will now be described. FIG. 5 is a flowchart illustrating a method for generating the shortcut image file 101 without printing. Any of the server 1401, the terminal apparatus 1406, and the image recording apparatus 1410 can generate the shortcut image file 101. However, it is assumed that the server 1401 generates the shortcut image file 101 in the description hereinafter. Note that similar processing is performed when the shortcut image file 101 is generated using the terminal apparatus 1406 or the image recording apparatus 1410.

First, the CPU 1402 refers to the original image file 100 corresponding to the shortcut image file 101 to be generated in step S500. It is assumed that a name of the original image file 100 is "D.JPG" hereinafter. Note that a location in which the original image file 100 is stored is not particularly limited as long as the CPU 1402 can access the original image file 100. For example, the original image file 100 may be stored in the server 1401, the terminal apparatus 1406, or the image recording apparatus 1410.

In step S501, the CPU 1402 determines whether the thumbnail image data 106 is included in the original image file 100.

When the determination is affirmative in step S501, the CPU 1402 extracts the thumbnail image data 106 in step S504. Then, the CPU 1402 determines the thumbnail image data 106 to be the thumbnail image data 116 in step S505.

On the other hand, when the determination is negative in step S501, the CPU 1402 arbitrarily reduces the DCF basic main image data 104 of the original image file 100. That is, the CPU 1402 generates reduced image data from the DCF basic main image data 104 in step S502. Then, the CPU 1402 determines the reduced image data to be the thumbnail image data 116 in step S503.

As described above, the thumbnail image data 106 of the original image file 100 or the image data obtained by reducing the DCF basic main image data 104 of the original image file 100 is determined to be the thumbnail image data 116 (second image data).

After the step S503 or step S505, the CPU 1402 generates the address tag 121 representing a location in which the original image file 100 is to be stored. Then, in step S506, the CPU 1402 assigns the address tag 121 to the thumbnail image data 116 obtained in step S503 or step S505. This processing will be described hereinafter.

Thereafter, the CPU 1402 generates the additional information tag 122 representing the additional information associated with the setting of the image processing to be performed on the original image file 100. In step S507, the CPU 1402 assigns the additional information tag 122 to the thumbnail image data 116 obtained in step S503 or step S505. The processing of generating the additional information tag 122 will be described in detail hereinafter.

As described above, the shortcut image file 101 is generated. A name of the shortcut image file 101 corresponding to the original image file 100 having the name of "D.JPG" is determined to be "d.JPG", for example.

Note that the shortcut image file 101 may includes the DCF basic main image data 104 included in the original image file 100.

Furthermore, the shortcut image file 101 may be generated in accordance with the flowchart of FIG. 5 immediately after the original image file 100 is generated by photographing using the digital still camera (image recording apparatus 1410). That is, generation processing of the shortcut image file 101 may be included in generation processing of the original image file 100 as a single operation.

Figure 6A:
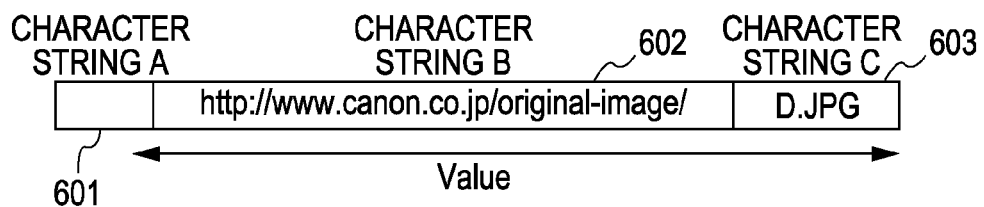
FIG. 6A is a diagram used to describe a method for generating the address tag.
Figure 6B:
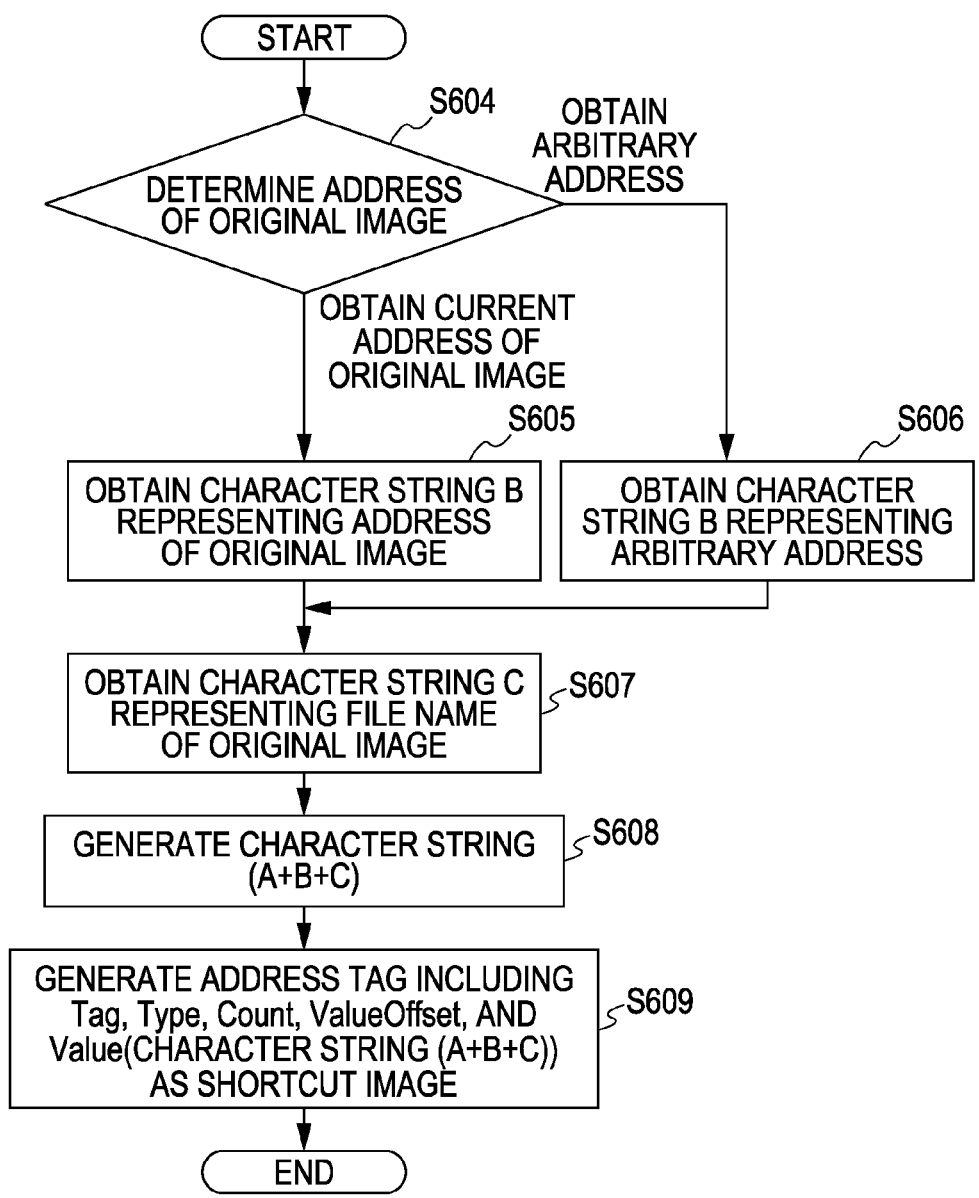
FIG. 6B is a flowchart illustrating the method for generating the address tag.

A method for generating the address tag 121 performed in step S506 will now be described. FIG. 6A is a diagram used to describe the method for generating the address tag 121, and FIG. 6B is a flowchart illustrating the method for generating the address tag 121.

The address tag 121 includes a path name (character string B) 602 representing the location in which the original image file 100 is stored, a file name (character string C) 603 of the original image file 100, and character-code type information (character string A) 601 representing a character code of the character strings B and C. Note that, as described above, the character-code type information (character string A) 601 may not be included in the address tag 121.

First, the CPU 1402 determines an address of the original image file 100 in step S604. Here, the CPU 1402 determines whether a location in which the original image file 100 is currently located is determined to be the location in which the original image file 100 is to be stored or an another arbitrary location is determined to be the location in which the original image file 100 is to be stored.

When the location in which the original image file 100 is currently located was determined to be the location in which the original image file 100 is to be stored in step S604, the CPU 1402 obtains the location in which the original image file 100 is currently stored as the path name (character string B) 602 in step S605.

On the other hand, when an arbitrary location was determined to be the location in which the original image file 100 is to be stored in step S604, a character string representing the arbitrary location is obtained as the path name (character string B) 602 in step S606. The arbitrary location is set by the user using an application which operates in the server 1401. For example, setting is made so that the original image file 100 is normally stored in a location indicated by "http://www.canon.co.jp/original-image/" of the server 1401.

Here, it is assumed that the location indicated by "http://www.canon.co.jp/original-image/" is set as the location in which the original image file 100 is to be stored, for example. Therefore, "http://www.canon.co.jp/original-image/" is obtained as the path name (character string B) 602.

After the operation in step S605 or step S606, the CPU 1402 obtains the file name (character string C) 603 of the original image file 100 in step S607. Here, "D.JPG" is obtained as the file name (character string C) 603.

Then, the CPU 1402 generates a character string indicating the address of the original image file 100 by combining the character-code type information (character string A) 601, the path name (character string B) 602, and the file name (character string C) 603 in step S608. Note that the character-code type information (character string A) 601 may not be included in the character string. For example, when the character string B and the character string C are described by being encoded using UTF-8, the character string A is not required.

Then, in step S609, the CPU 1402 generates the address tag 121 employing the character string generated in step S607 as "Value", and assigns the address tag 121 to the thumbnail image data 116 obtained in step S503 or step S505. Here, the address tag 121 employing "http://www.canon.co.jp/original-image/" as "Value" is assigned to the shortcut image file 101 having the file name of "d.JPG".

Figure 7A:
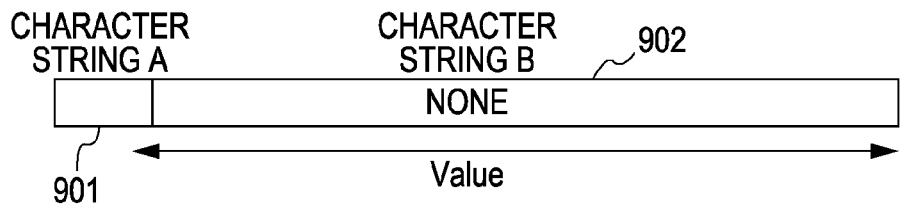
FIG. 7A is a diagram used to describe a first method for generating the additional information tag.
Figure 7B:
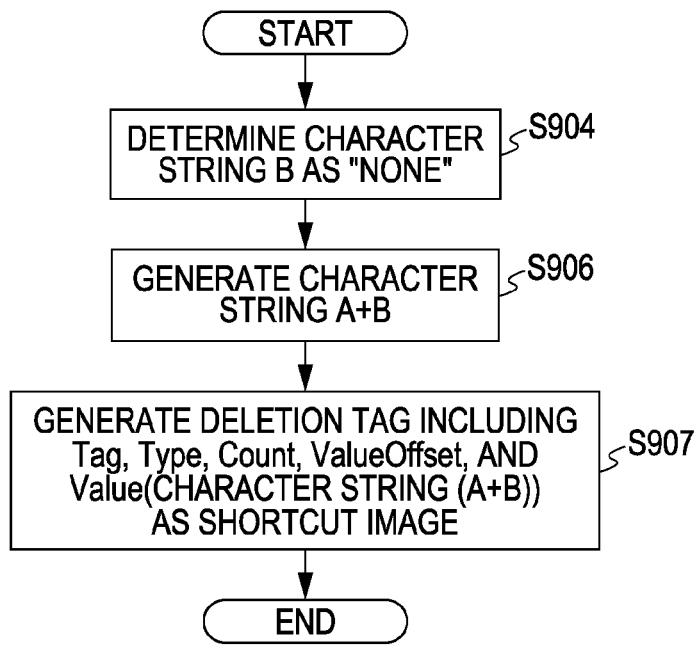
FIG. 7B is a flowchart illustrating the first method for generating the additional information tag.

A method for generating the additional information tag 122 performed in step S507 will now be described. FIG. 7A is a diagram used to describe a first method for generating the additional information tag 122, and FIG. 7B is a flowchart illustrating the first method for generating the additional information tag 122.

The additional information tag 122 includes additional information (character string B) 902 representing information on the setting of the image processing to be performed on the original image file 100 and character-code type information (character string A) 901 representing a character code of the character string B. Note that, as described above, the character-code type information (character string A) 901 may not be included in the additional information tag 122.

Here, since the shortcut image file 101 is generated without printing, the CPU 1402 sets the additional information (character string B) 902 to be "none" in step S904.

Then, the CPU 1402 generates a character string associated with the setting of the image processing by combining the character-code type information (character string A) 901 and the additional information (character string B) 902 in step S906. Here, the character-code type information (character string A) 901 may not be included in the character string.

Thereafter, in step S907, the CPU 1402 generates the additional information tag 122 employing the character string generated in step S906 as "Value", and assigns the additional information tag 122 to the thumbnail image data 116 obtained in step S503 or step S505. Here, the additional information tag 122 employing "none" as "Value" is assigned to the thumbnail image data 116.

As described above (with reference to FIGS. 5 to 7), the shortcut image file 101 is generated from the original image file 100. For example, the shortcut image file 101 having the name of "d.JPG" corresponding to the original image file 100 having the name of "D.JPG" is generated. Since the address tag 121 of the shortcut image file 101 represents the location in which the original image file 100 is stored ("http://www.canon.co.jp/original-image/IMG_0011.JPG"), the application or the image control apparatus capable of accessing the shortcut image file 101 can access the location in which the original image file 100 is stored as needed.

An example of a first method for managing original image files 100 generated as described above and shortcut image files 101 corresponding to the original image files 100 in the image management file system shown in FIG. 1 will be described. FIG. 8 is a diagram illustrating a first example of a relationship between the original image files 100 and the shortcut image files 101.

After the shortcut image files 101 are generated in the server 1401 as described above, the shortcut image files 101 is transmitted to the terminal apparatus 1406 by e-mail, for example. Consequently, as shown in FIG. 8, the original image files 100 are stored in the server 1401, and the shortcut image files 101 are stored in the terminal apparatus 1406. Here, it is assumed that the four original image files 100 (original image files A, B, C, and D) are stored in a predetermined storage area ("http://www.canon.co.jp/original-image/"). Furthermore, it is assumed that four shortcut image files 101 (shortcut image files a, b, c, and d) corresponding to the four original image files 100 are stored in a predetermined storage area represented by "C:¥My Pictures¥shortcut-image¥", for example, in the terminal apparatus 1406.

In this example, an original image file "D" 301 having a file name of "D.JPG" is stored in the location represented by "http://www.canon.co.jp/original-image/" as shown in FIG. 8. Therefore, "http://www.canon.co.jp/original-image/D.JPG" is recorded as "Value" 304 of an address tag 121 of the shortcut image file "d" 302. Similarly, for the shortcut image files "a", "b", and "c", address tags 121 suitable for the shortcut image files "a", "b", and "c" are recorded.

Since the shortcut image file "d" 302 is generated from the original image file "D" 301 without printing, "none" is recorded as "Value" 305 in the additional information tag 122 of the shortcut image file "d" 302. A shortcut image file "d'" will be described hereinafter.

Under this condition, the user can obtain brief information on the original image file "D" 301 stored in the server 1401 by merely referring to a thumbnail image of the shortcut image file "d" 302 stored in the HDD 1409 of the terminal apparatus 1406, for example. That is, the user can obtain desired information without connecting the terminal apparatus 1406 to the server 1401. For example, it is assumed that the user obtains the original image file 100 by photographing using the digital still camera (image recording apparatus 1410) and the original image file 100 is stored in the server 1401 which provides on-line photo album service. Furthermore, it is assumed that the shortcut image file 101 is generated from the shortcut image file 101 in the server 1401. In this case, the user can obtain desired information on the original image file 100 by merely referring to a thumbnail image of the shortcut image file 101 stored in the HDD 1409 in the terminal apparatus 1406.

Moreover, although a memory area of a mobile terminal such as a PDA has a limitation, when the shortcut image file 101 is merely stored in the memory area, brief information on the original image file 100 can be obtained. Furthermore, the user can obtain desired detailed information on an image by obtaining the original image file 100 from the server 1401.

The location in which the original image file 100 is not limited. However, when the original image file 100 is stored in the server 1401, the detailed information on the original image file 100 can be obtained using the shortcut image file 101 from the terminal apparatus 1406 which can be connected to the server 1401. Accordingly, in this case, when image data is transmitted and received between users, the shortcut image file 101 may be used. For example, in a case where data of a photographed image is to be transmitted by e-mail, if the shortcut image file 101 which does not include main image data is attached to an e-mail, a file size of the e-mail can be reduced when compared with a case where the original image file 100 is attached to the e-mail. The user who received the shortcut image file 101 can obtain the original image file 100 from the shortcut image file 101 as desired by accessing the server 1401 or obtain detailed information on the original image file 100.

Note that as a method for transmitting and receiving an image of a small file size between users, the method for obtaining an original image in accordance with an instruction included in an e-mail is disclosed in U.S. Pat. No. 6,101,526 as described above. However, in this method, the instruction included in the e-mail should be referred to every time high-resolution image data is to be obtained. On the other hand, according to this exemplary embodiment, since the location in which the original image file 100 is stored is recorded in the shortcut image file 101, such cumbersome operations are not required.

In addition, according to this exemplary embodiment, in addition to e-mails, image data can be transmitted and received between users by relaxing restriction of a file size. For example, when only the shortcut image file 101 is stored in a memory card and a first user gives the memory card to a second user, the second user can obtain an arbitrary original image file 100 from the memory card. In this case, the e-mail itself as disclosed in U.S. Pat. No. 6,101,526 is not required to be used.

Note that since "Value" 305 of the additional information tag 122 of the shortcut image file "d" 302 is "none", when image data corresponding to the original image file 100 is printed using the "Value" 305, printing processing based on default setting is performed. The default setting means setting of printing processing for the original image file 100. On the other hand, when the image data corresponding to the original image file 100 is subjected to printing processing using the shortcut image file "d" 302 while the setting is changed, the printing processing based on the setting is performed. Furthermore, although detailed description will be made hereinafter, a shortcut image file is newly generated from the shortcut image file "d" 302.

Figure 9:
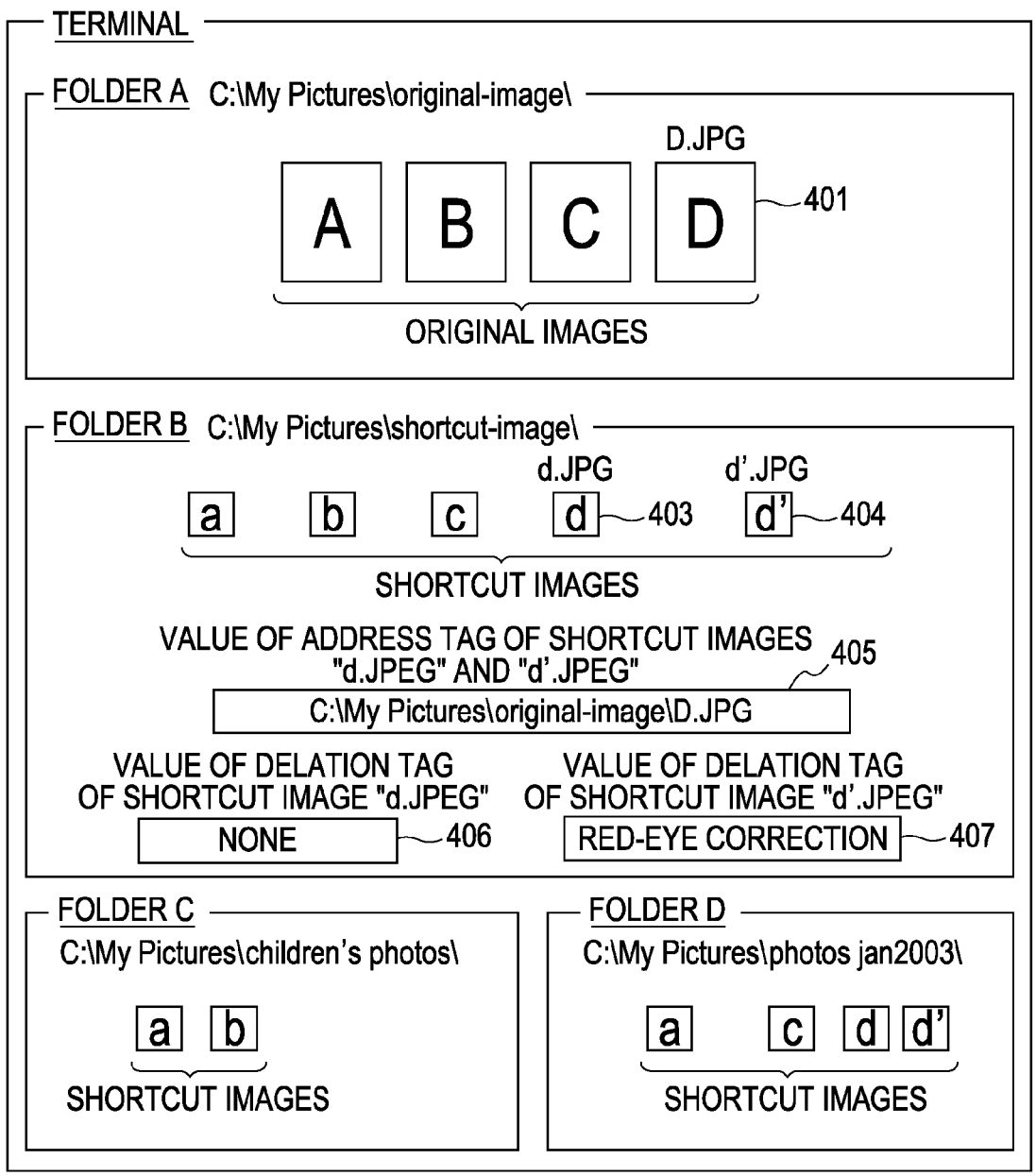
FIG. 9 is a diagram illustrating a second example of the relationship between the original image file and the shortcut image file.

An example of a second method for managing original image files 100 and shortcut image files 101 corresponding to the original image files 100 will now be described. FIG. 9 is a diagram illustrating a second example of the relationship between the original image files 100 and the shortcut image files 101. In the first example shown in FIG. 8, the original image files 100 and the shortcut image files 101 are stored in the different hosts (the server 1401 and the terminal apparatus 1406). On the other hand, in the second example shown in FIG. 9, the original image files 100 and the shortcut image files 101 are stored in different folders (directories) in the identical host (the terminal 1406). Note that the original image files 100 and the shortcut image files 101 may be stored in different folders in the identical server 1401.

For example, it is assumed that original image files 100 are input in the terminal apparatus 1406 by the user, shortcut image files 101 are generated in the terminal apparatus 1406, and the shortcut image files 101 are stored in folders different from that storing the original image files 100. Here, it is assumed that the original image files (A, B, C, and D) 100 are stored in a folder A whereas the shortcut image files (a, b, c, and d) 101 corresponding to the original image files 100 are stored in other folders in the terminal apparatus 1406. For example, it is assumed that the shortcut image files "a" to "d" 101 are stored in a folder B, the shortcut image files "a" and "b" 101 are stored in a folder C, and the shortcut image files "a", "c", and "d" 101 are stored in a folder D. The folder A is represented by "C:¥My Pictures¥original-image¥", and the folder B is represented by "C:¥My Pictures¥shortcut-image¥". The folder C is represented by "C:¥My Pictures¥children's photos¥", and the folder D is represented by "C:¥My Pictures¥photos Jan2003".

In this example, as shown in FIG. 9, a location in which an original image file "D" 401 having a file name of "D.JPG" is represented by "C¥My Pictures¥original-image¥". Therefore, as "Value" of an address tag 121 for the shortcut image file "d" 403, "C¥My Pictures¥original-image¥D.JPG" is recorded. Similarly, for the shortcut image files "a", "b", and "c", address tags 121 suitable for the shortcut image files "a", "b", and "c" are recorded. A shortcut image file "d'" will be described hereinafter.

Under this condition, the user can obtain brief information on the original image file "D" 401 stored in the folder A in the terminal apparatus 1406 by merely referring to a thumbnail image of the shortcut image file "d" 403 stored in the HDD 1409 of the terminal apparatus 1406, for example. That is, the user can obtain desired information without searching for the original image file "D" 401. For example, it is assumed that the user obtains the original image files 100 by photographing using the digital still camera (image recording apparatus 1410) and the original image files 100 are stored in the folder A. In addition, it is assumed that the shortcut image files 101 corresponding to the original image files 100 are stored in another folder. In this case, the original image files 100 may be collectively stored in a certain folder, and the user may categorize the original image files 100 in accordance with photographed time and/or themes so as to store the original image files 100 in folders using the shortcut image files 101.

A plurality of shortcut image files 101 may be generated from a single original image file 100. For example, it is assumed that an original image file "A" 100 includes image data generated in January 2003, and an object of an image corresponding to the image data includes a child. In this case, the user may perform an operation so that an original image file "C" 100 including image data corresponding to an image of a child as an object and an original image file "D" 100 including information on photographed time of January 2003 include an identical shortcut image file "a" 101. By this, in both cases where a photo captured in January 2003 is searched for, and where a photo including an image of child is searched for, the shortcut image file "a" 101 corresponding to the original image file "A" 100 is found. A size of the shortcut image file 101 may be made smaller when the shortcut image file 101 does not include main image data. Therefore, even when each of shortcut image files 101 associated with a single original image file 100 is included in a plurality of categories, increase in file size is suppressed.

Note that since "Value" 406 of the additional information tag 122 of the shortcut image file "d" 403 is "none", when image data corresponding to the original image file 100 is printed using the "Value" 406, printing processing based on the default setting is performed. On the other hand, when the image data corresponding to the original image file 100 is subjected to printing processing using the shortcut image file "d" 403 while the setting is changed, the printing processing based on the setting is performed. Furthermore, although detailed description will be made hereinafter, a shortcut image file is newly generated from the shortcut image file "d" 403.

Figure 12:
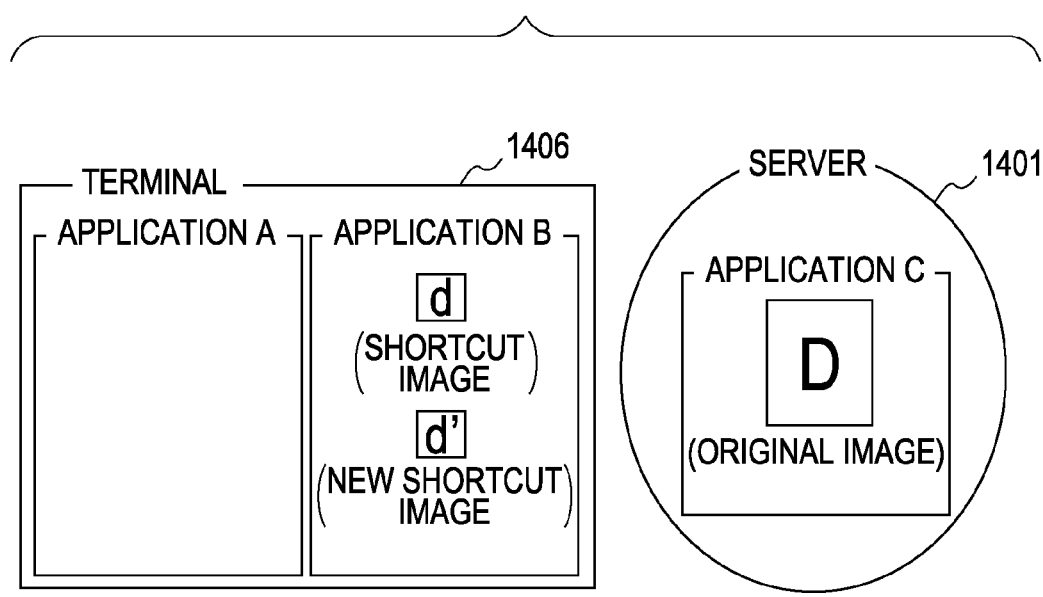
FIG. 12 is a diagram illustrating a relationship among a server, a terminal, and applications A to C.

A method for newly generating a shortcut image file from the shortcut image file 101 according to this exemplary embodiment will now be described. FIG. 10 is a flowchart illustrating the method for newly generating a shortcut image file from one of the shortcut image files 101. It is assumed that applications A and B operate in the terminal apparatus 1406 and an application C operates in the server 1401 as shown in FIG. 12 in this example. The application A is used for image control when the user views and deletes an image and issues an instruction for printing, for example. The application B is used to manage the shortcut image files 101 stored in the terminal apparatus 1406, for example. The application C is used to manage the original image files 100 stored in the server 1401.

First, the CPU 1407 determines whether printing processing was performed based on setting other than default setting on the original image file 100 in step S801. Examples of the setting other than default setting include image correction setting and layout setting.

When the determination is negative in step S801, the CPU 1407 does not newly generate a shortcut image file and the process is terminated.

On the other hand, when the determination is affirmative, the CPU 1407 extracts the thumbnail image data 116 in step S802. Then, the CPU 1407 determines that the thumbnail image data 116 is used as the thumbnail image data 116 for a new shortcut image file in step S803.

Thereafter, the CPU 1407 generates an address tag 121 representing a location in which the original image file 100 is stored in accordance with the flowchart shown in FIG. 6. In step S804, the CPU 1407 assigns the generated address tag 121 to the thumbnail image data 116 generated in step S803. Note that instead of the generation of the address tag 121, the address tag 121 assigned to the original shortcut image file 101 may be copied.

Subsequently, the CPU 1407 generates an additional information tag 122 representing additional information on the setting of image processing performed on the original image file 100. In step S805, the CPU 1407 assigns the generated additional information tag 122 to the thumbnail image data 116 generated in step S803. The processing of generating the additional information tag 122 will be described in detail hereinafter.

When the information on the setting of printing, for example, is included in the additional information tag 122, the CPU 1407 performs processing in accordance with the information included in the additional information tag 122 on the thumbnail image data 116 so that thumbnail image data 118 is obtained in step S806. For example, in a case where image data included in the original image file 100 is color data, when black-and-white printing processing is performed on the original image file 100, image processing is performed on the thumbnail image data 116 so that black-and-white thumbnail image data 116 is obtained.

In this way, the new shortcut image file 101 is generated. It is assumed that a name of the shortcut image file 101 newly generated from the shortcut image file 101 having a file name of "d.JPG" is determined to be "d'.JPG", for example. When image data corresponding to the original image file 100 is printed using the newly-generated shortcut image file 101, printing processing based on the setting of the image processing, for example, assigned to the additional information tag 122 is performed. On the other hand, when the image data corresponding to the original image file 100 is subjected to printing processing using the newly-generated shortcut image file 101 while the setting is changed, the printing processing based on the setting of the image processing assigned to the additional information tag 122 and the changed setting is performed. Therefore, another shortcut image file 101 is newly generated.

Note that the newly generated shortcut image file 101 may include the main image data 104 the same as that included in the original image file 100.

Figure 11A:
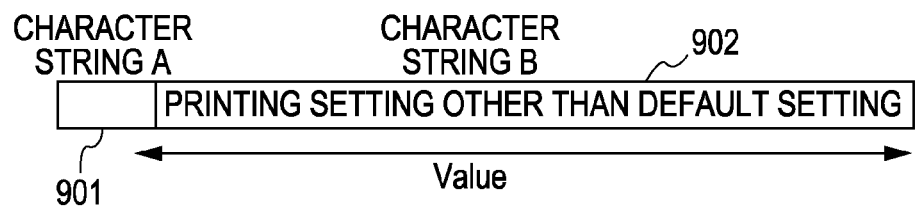
FIG. 11A is a diagram used to describe a second method for generating the additional information tag.
Figure 11B:
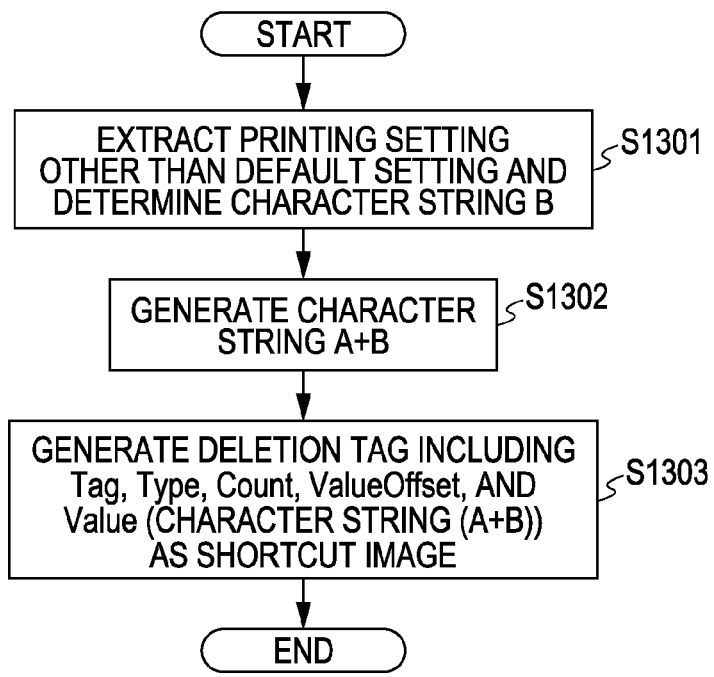
FIG. 11B is a flowchart illustrating the second method for generating the additional information tag.

A method for generating the additional information tag 122 performed in step S805 will be now described. FIG. 11A is a diagram used to describe a second method for generating the additional information tag 122, and FIG. 11B is a flowchart illustrating the second method for generating the additional information tag 122.

In step S1301, the CPU 1407 extracts the information on the setting of printing other than the default setting, and determines the extracted information to be additional information (character string B) 902. For example, in a case where the image data included in the shortcut image file 101 is color data, when black-and-white printing processing is performed on the shortcut image file 101, information representing that the black-and-white printing processing is performed is determined to be the additional information (character string B) 902.

Then, the CPU 1407 generates a character string associated with the setting of the image processing by combining the character-code type information (character string A) 901 and the additional information (character string B) 902 in step S1302. Note that the character-code type information (character string A) 901 may not be included in the character string.

Thereafter, in step S1303, the CPU 1407 generates the additional information tag 122 employing the character string generated in step S1302 as "Value", and assigns the additional information tag 122 to the thumbnail image data 116 obtained in step S803. Here, the additional information tag 122 employing "black-and-white printing" as "Value" is assigned to the thumbnail image data 116.

The new shortcut image file 101 is generated from the shortcut image file 101 as described above. For example, a new shortcut image file 101 having a name of "d'.JPG" corresponding to the original image file 100 which has the name of "D.JPG" and which is stored in the server 1401 is generated.

The newly generated shortcut image file 101 can be managed in the same way as the other shortcut image files 101. For example, as shown in FIG. 8 or 9, the shortcut image file 101 having the name of "d'.JPG" can be managed in the same way as the shortcut image file 101 having the name of "d.JPG".

In the example shown in FIG. 8, "http://www.canon.co.jp/original-image/D.JPG" is also recorded as "Value" of the address tag 121 of a shortcut image file "d'" 303. When the shortcut image file "d'" 303 is generated from the shortcut image file "d" 302 through black-and-white printing processing, "black-and-white printing" is recorded as "Value" 306 of the additional information tag 122 of the shortcut image file "d'" 303.

In this case, a thumbnail image corresponding to the shortcut image file "d" 302 is a color image whereas a thumbnail image corresponding to the shortcut image file "d'" 303 is a black-and-white image. Accordingly, when printing processing is to be performed after the shortcut image files "d" 302 and the shortcut image file "d'" 303 are generated, the user can immediately recognize not only the shortcut image file "d" 302 suitable for color printing but also the shortcut image file "d'" 303 suitable for black-and-white printing. When an instruction for printing processing to be performed on the original image file "D" 301 is issued using the shortcut image file "d" 302 without particular setting of printing processing, the color printing is performed. On the other hand, when an instruction for printing processing to be performed on the original image file "D" 301 is issued using the shortcut image file "d'" 303 without particular setting of printing processing, the black-and-white printing is performed. That is, when the shortcut image file "d'" 303 is selected, the black-and-white printing can be performed without newly performing setting of printing processing. Accordingly, operability for the user is improved. In addition, since the shortcut image file "d'" 303 does not require the main image data 104, even when the shortcut image file "d'" 303 is added, an amount of data is not considerably increased.

In the example shown in FIG. 9, "http://www.canon.co.jp/original-image/D.JPG" is also recorded as "Value" 405 of the address tag 121 of a shortcut image file "d'" 404. In a case where the shortcut image file "d'" 404 is generated from the shortcut image file "d" 403 through red-eye correction processing, "red-eye correction" is recorded as "Value" 407 of the additional information tag 122 of the shortcut image file "d'" 404.

In this case, a thumbnail image corresponding to the shortcut image file "d" 403 is an image which has not been subjected to image processing whereas a thumbnail image corresponding to the shortcut image file "d'" 404 is an image subjected to image processing, i.e., red-eye correction processing. Accordingly, when printing processing is to be performed after the shortcut image file "d" 403 and the shortcut image file "d'" 404 are generated, the user can immediately recognize not only the shortcut image file "d" 302 suitable for printing of an image which has not been subjected to image processing but also the shortcut image file "d'" 303 suitable for printing of an image which has been subjected to the red-eye correction processing. Note that text, for example, may be additionally displayed in order to more clearly represent that the shortcut image file "d'" 404 has been subjected to the red-eye correction processing. When an instruction for printing processing to be performed on the original image file "D" 401 is issued using the shortcut image file "d'" 404 without particular setting of printing processing, an image which has been subjected to the red-eye correction processing is printed. That is, when the shortcut image file "d'" 404 is selected, an image which has been subjected to the red-eye correction processing is printed without newly performing setting of printing processing. Accordingly, operability for the user is improved. In addition, since the shortcut image file "d'" 404 does not require the main image data 104, even when the shortcut image file "d'" 404 is added, an amount of data is not considerably increased.

Note that the additional information (character string B) 902 such as "none", "black-and-white printing", or "red-eye correction" of the additional information tag 122 is not necessarily be described in Japanese, and may be described in a symbol or a character string of the alphabet which can specify content of the setting of the printing processing. Furthermore, the additional information (character string B) 902 may represent a single type of setting of the printing processing or represent a plurality of types of setting of the printing processing. For example, when "normal" is set as quality of printing in the default setting, "black-and-white printing" and "clear" may be simultaneously set.

In the processing of FIG. 10 and processing of FIG. 11B, the printing processing is performed using the shortcut image file 101. However, printing processing may be similarly performed using the original image file 100. In this case, the processing of FIG. 11B is performed instead of the processing of FIG. 7 when the operation of step S507 in FIG. 5 is performed.

Timing of the generation of the new shortcut image file 101 is not limited to timing after the printing processing is terminated. For example, the new shortcut image file 101 may be generated after a print preview is performed or after the image processing is performed. Furthermore, after the printing processing is performed, after the print preview is performed, or after the image processing is performed, the user may receive a query regarding whether the new shortcut image file 101 is to be generated and make determination. Furthermore, an instruction of an output includes an instruction of the printing processing and an instruction of display in another apparatus. That is, also in a case where data of a photographed image is modified in a display unit without performing the printing processing, a shortcut image file may be generated.

The address tag 121 representing the location in which the original image file 100 is stored may be included in the original image file 100. Such a configuration is effective when the original image file 100 is included in both the server 1401 and the terminal apparatus 1406 (client apparatus). For example, such a configuration is effective in a case where the printing processing is to be performed using the client apparatus, permission of the printing processing is given to the client apparatus after the client apparatus accesses the server 1401 using information on the address tag 121 included in the client apparatus and it is confirmed that the original image file 100 is not changed using the server 1401. Here, instead of the confirmation in which the original image file 100 is not changed, the client apparatus may be determined to be an authenticated client apparatus. With such a configuration, when the shortcut image file 101 is stored in the client apparatus, the original image file 100 should be read after the confirmation or the authentication. Here, if the original image file 100 is stored in the client apparatus, download for reading the original image file 100 can be eliminated. That is, after the confirmation or the authentication is performed, the printing processing can be performed using the original image file 100 stored in the client apparatus without downloading the original image file 100. Accordingly, time required for the downloading is eliminated, and time required for the printing processing is reduced.

Figure 13A:
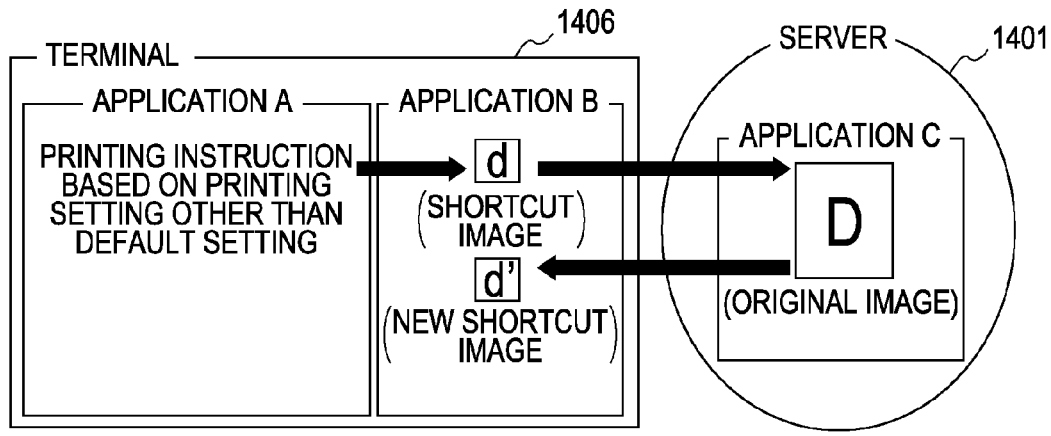
FIGS. 13A and 13B are diagrams illustrating processing of newly generating a shortcut image file.
Figure 13B:
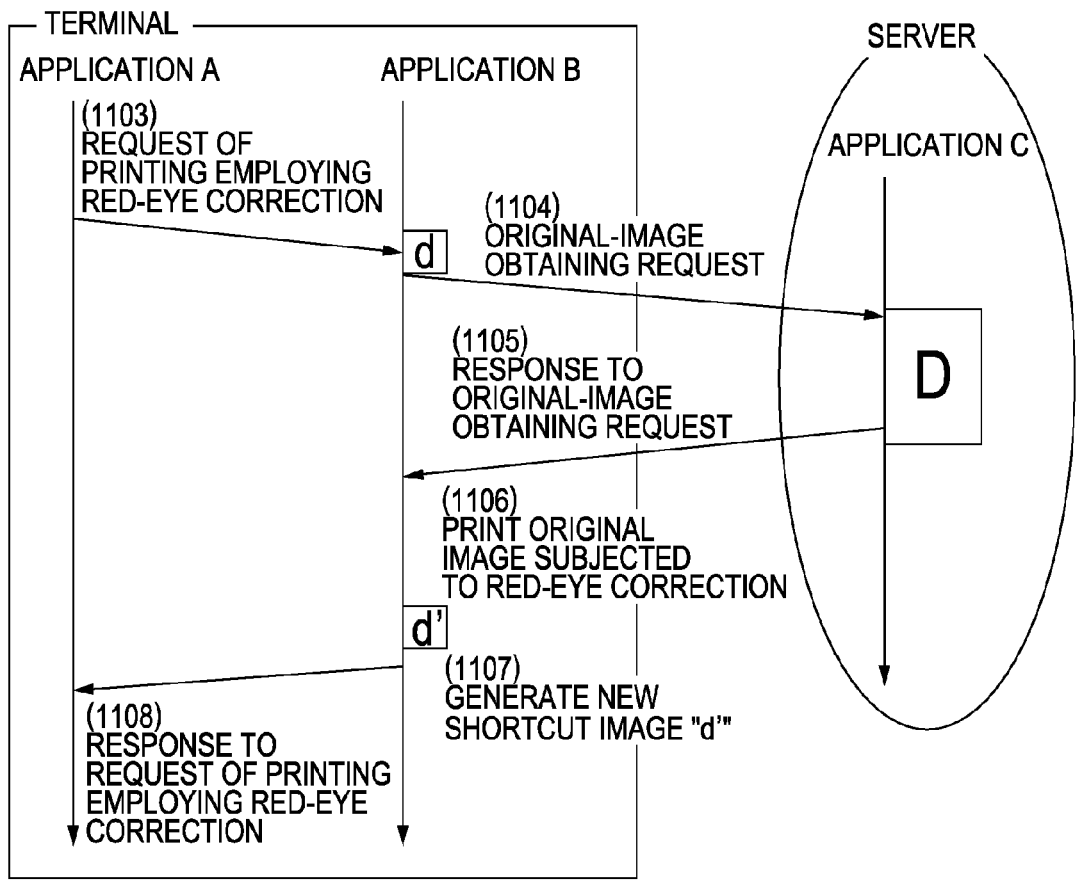

Processing of newly generating the shortcut image file "d'" 101 when the original image file "D" 100 is printed using the shortcut image file "d" 101 after the setting of the printing processing is changed will be described in detail. FIGS. 13A and 13B are diagrams illustrating the processing of newly generating a shortcut image file. Specifically, FIG. 13A is a schematic diagram illustrating requests transmitted among applications, and FIG. 13B is a diagram illustrating a deletion procedure interface.

When the user issues an instruction of printing using the application A, the application A issues, to the application B, a request 1103 for printing using the shortcut image file "d" 101 which is managed by the application B. Upon reception of the request, the application B confirms information on the address tag 121 of the shortcut image file "d" 101. Then, the application B issues a request 1104 for obtaining an original image to the application C in accordance with the information on the address tag 121 of the shortcut image file "d" 101. Upon reception of the request 1104 for obtaining the original image, the application C transmits a response 1105 for the request 1104 for obtaining the original image. When the response 1105 is transmitted and when the application C does not include the original image file 100 corresponding to the request 1104 for obtaining the original image, the application C informs the application B of the fact that the application C does not include the original image file 100. On the other hand, when the application C includes the requested original image file 100, the application C transmits the requested original image file 100 to the application B.

Thereafter, the application B checks the additional information tag 122 of the shortcut image file "d" 101 using the CPU 1407 as a tag determination unit. Here, it is assumed that "none" is described in the additional information tag 122. Furthermore, the application B determines whether the request 1103 is a request for printing in accordance with the setting of the printing processing other than the default setting. Here, it is assumed that the printing request 1103 is a request for printing in accordance with the setting of the printing processing other than the default setting, that is, printing in accordance with the red-eye correction processing. Then, the application B executes printing 1106 in accordance with a combination of the setting of printing represented by the additional information tag 122 and the setting of printing represented by the printing request 1103. In this example, the printing 1106 is performed after the red-eye correction processing is performed. If "VIVID" is assigned to the additional information tag 122 and the printing request 1103 for the red-eye correction is issued, image processing in accordance with a combination of the red-eye correction processing and image processing corresponding to "VIVID" is performed, and a resultant image is printed. Here, the image processing corresponding to "VIVID" is image processing of making color of the image vivid. Use of this image processing attains natural color for people and clear color for grasses, trees, the sky, and the sea in a background.

Then, the application B performs generation 1107 of the shortcut image file "d'" 101 in accordance with the flowchart of FIG. 10. Here, the address tag 121 of the shortcut image file "d'" 101 is the same as that of the shortcut image file "d" 101. Furthermore, the setting of printing "red-eye correction" specified using the application A is added to the additional information tag 122 of the shortcut image file "d'" 101. The thumbnail data 118 of the shortcut image file "d'" 101 corresponds to the thumbnail data 118 of the shortcut image file "d" 101 obtained after the red-eye correction processing is performed.

Note that when another type of setting of printing (for example, "VIVID") has already been assigned to the additional information tag 122 of the shortcut image file "d" 101, setting of printing indicated by "VIVID, red-eye correction" is set in the additional information tag 122 of the shortcut image file "d'" 101. The thumbnail data 118 of the shortcut image file "d" 101 corresponds to the thumbnail image data 108 of the original image file "D" 100 obtained after the image processing corresponding to "VIVID" is performed. Therefore, the thumbnail data 118 of the shortcut image file "d'" 101 corresponds to the thumbnail data 108 of the original image file "D" 100 obtained after the image processing corresponding to "VIVID" and the red-eye correction processing are performed. That is, the thumbnail data 118 of the shortcut image file "d'" 101 corresponds to the thumbnail data 118 of the shortcut image file "d" 101 after the red-eye correction processing is performed.

After performing the generation 1107 of the new shortcut image file 101, the application B transmits a response 1108 for the request for printing to the application A.

Note that the exemplary embodiment of the present invention may be realized by executing a program using a computer. A unit which supplies the program to the computer, for example, a computer-readable recording medium such as CD-ROM (Compact Disc Read-Only Memory), or other computer-readable recording medium known in the art, including the program or a transmission medium such as the Internet used to transmit the program may be included in exemplary embodiments of the present invention. Furthermore, a program used for the printing processing may be included in an exemplary embodiment of the present invention. The program, the recording medium, the transmission medium, and program products are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-309060 filed Nov. 29, 2007, which is hereby incorporated by reference herein in its entirety.

What is claimed is:
1. A non-transitory computer-readable recording medium storing a program which, when executed by a computer, causes the computer to execute:
inputting an instruction by a user for designating an output condition for output of an image;
obtaining an address tag for specifying the image;

outputting of the image in accordance with the output condition designated by the inputted instruction, and generating a file including the obtained address tag and additional information tag for specifying the output condition designated by the inputted instruction as an output condition used in another outputting of the image;

wherein, in a case where an instruction by a user for designating an output condition is inputted, both of the outputting of the image and the generating of the file are executed, by using the output condition designated by the user commonly in the outputting and the generating, and wherein the generated file includes, in addition to the address tag for specifying the image and the additional information tag, a second image having a resolution lower than that of the image to be specified.

2. The computer-readable recording medium according to claim 1,
wherein the address tag indicates a location in which the image is stored and indicates the image in the location.

3. The computer-readable recording medium according to claim 1,
wherein the image to be specified by the address tag and the generated file are stored in different locations.

4. The computer-readable recording medium of claim 1, wherein the program causes the computer to further execute:
obtaining the generated file including the address tag and the additional information tag; obtaining the image specified by the address tag included in the obtained file; and
outputting the obtained image, in accordance with an output condition indicated by the additional information tag included in the obtained file.

5. The computer-readable recording medium according to claim 1,
wherein the additional information tag indicates a printing condition for printing of an image, and the obtained image is printed by a printing apparatus in accordance with the printing condition indicated by the additional information tag.

6. The computer-readable recording medium according to claim 1,
wherein in a case where a plurality of output conditions are designated, a plurality of files are generated in a manner such that the plurality of additional information tags included in the plurality of files indicate, for an image commonly specified by the plurality of address tags included in the plurality of files, output conditions which are different in accordance with the files.

7. A file management apparatus which manages a file, comprising:
a processor; and
a memory coupled to the processor, the memory including instructions that, when executed by the processor, cause the processor to perform operations comprising:
inputting an instruction by a user for designating an output condition for output of an image;
obtaining an address tag for specifying the image;
outputting the image in accordance with the output condition designated by the inputted instruction; and
generating a file including the address tag and additional information tag for specifying the output condition designated by the inputted instruction as an output condition used in another outputting of the image;

wherein, in a case where an instruction by a user for designating an output condition is inputted, both of the outputting of the image and the generating of the file are executed, by using the output condition designated by the user commonly in the outputting and the generating;

wherein the generated file includes, in addition to the address tag for specifying the image and the additional information tag, a second image having a resolution lower than that of the image to be specified.

8. The file management apparatus according to claim 7, wherein the operations further comprises:
obtaining the file including the address tag and the additional information tag;
obtaining the image specified by the address tag included in the file; and
outputting the image, in accordance with an output condition indicated by the additional information tag included in the file.

9. A file management method for managing a file, comprising:
inputting, using a processor, an instruction by a user for designating an output condition for output of an image;
obtaining an address tag for specifying the image;
outputting the image in accordance with the output condition designated by the inputted instruction; and
generating a file including the obtained address tag and additional information tag for specifying the output condition designated by the inputted instruction as an output condition used in another outputting of the image;

wherein, in a case where an instruction by a user for designating an output condition is inputted, both of the outputting of the image and the generating of the file are executed, by using the output condition designated by the user commonly in the outputting and the generating, and wherein the generated file includes, in addition to the address tag for specifying the image and the additional information tag, a second image having a resolution lower than that of the image to be specified.

10. The file management method according to claim 9, further comprising:
obtaining the generated file including the address tag and the additional information tag;
obtaining the image specified by the address tag included in the obtained file; and
outputting the obtained image, in accordance with an output condition indicated by the additional information tag included in the obtained file.

* * * * *